(12) United States Patent
Pinto (10) Patent No.: US 11,299,267 B2
(45) Date of Patent: Apr. 12, 2022

(54) ELECTRIC POWERED PARAGLIDER

(71) Applicant: Ryan Evaristo Pinto, South Goa (IN)

(72) Inventor: Ryan Evaristo Pinto, South Goa (IN)

(73) Assignee: Ryan Evaristo Pinto

( * ) Notice: Subject to any disclaimer, the term of this patent is extended or adjusted under 35 U.S.C. 154(b) by 354 days.

(21) Appl. No.: 16/607,946

(22) PCT Filed: Sep. 10, 2019

(86) PCT No.: PCT/IB2019/057611
§ 371 (c)(1),
(2) Date: Oct. 24, 2019

(87) PCT Pub. No.: WO2021/019291
PCT Pub. Date: Feb. 4, 2021

(65) Prior Publication Data
US 2021/0362853 A1 Nov. 25, 2021

(30) Foreign Application Priority Data
Jul. 29, 2019 (IN) .............................. 201921030531

(51) Int. Cl.
*B64C 31/036* (2006.01)
*B64D 27/24* (2006.01)

(52) U.S. Cl.
CPC ............ *B64C 31/036* (2013.01); *B64D 27/24* (2013.01)

(58) Field of Classification Search
CPC .................................................... B64C 31/036
USPC ......................................................... 244/902
See application file for complete search history.

(56) References Cited

U.S. PATENT DOCUMENTS

| 5,044,576 A * | 9/1991 | Inada .................... B64C 31/036 244/13 |
| 5,160,100 A * | 11/1992 | Snyder .................. B64C 31/036 244/13 |
| 8,215,588 B2 * | 7/2012 | Wrage ...................... B63H 8/16 244/155 A |
| 8,448,898 B1 | 5/2013 | Frolov et al. |

(Continued)

FOREIGN PATENT DOCUMENTS

| CH | 700620 A2 * | 9/2010 | ............ B64D 27/24 |
| CN | 102514711 A | 6/2012 | |

(Continued)

*Primary Examiner* — Christopher P Ellis
(74) *Attorney, Agent, or Firm* — Jason C. Cameron (57) ABSTRACT

An electric powered paraglider is provided. An electric powered paraglider includes a frame which includes a plurality of connector points. The electric powered paraglider also includes a propulsion unit mechanically coupled to the frame. The propulsion unit includes at least one propeller and configured to generate a predefined amount of thrust using at least one electric motor. The electric powered paraglider also includes a throttle controller unit physically or wirelessly connected to the flight control unit. The throttle controller unit includes at least three switches. The at least three switches are configured to operate one or more parameters of the paraglider. The electric powered paraglider also includes a power latching unit mechanically coupled to the frame. The power latching unit includes a plurality of batteries. The power latching unit is configured to allow a user to swap the plurality of batteries by implementing a power latching mechanism.

4 Claims, 5 Drawing Sheets

(56) References Cited

U.S. PATENT DOCUMENTS

| | | | |
|---|---|---|---|
| 10,029,786 B1* | 7/2018 | Adams | B64D 17/30 |
| 2004/0195438 A1 | 10/2004 | Chamberlain | |
| 2008/0083847 A1* | 4/2008 | Mau | B64C 3/46 |
| | | | 244/13 |
| 2009/0108135 A1* | 4/2009 | Shaw | B64C 3/30 |
| | | | 244/158.3 |
| 2021/0316855 A1* | 10/2021 | Sherman | B64C 37/00 |

FOREIGN PATENT DOCUMENTS

| | | | | |
|---|---|---|---|---|
| CN | 106428553 B | * | 9/2018 | |
| CN | 108622406 A | * | 10/2018 | |
| CN | 110228588 A | * | 9/2019 | |
| CN | 112644705 A | * | 4/2021 | |
| DE | 10050654 A1 | * | 5/2002 | ........... B64C 31/036 |
| DE | 102013000461 A1 | * | 7/2014 | ........... B64C 31/036 |
| DE | 102015120680 A1 | * | 6/2017 | ........... B64C 31/036 |
| DE | 102019001968 A1 | * | 9/2020 | ........... B64C 31/036 |
| EP | 3674217 A1 | * | 7/2020 | ........... B64D 17/725 |
| WO | WO-03033344 A2 | * | 4/2003 | ........... B64C 11/001 |
| WO | WO-2014055044 A1 | * | 4/2014 | ........... B64C 31/036 |
| WO | WO-2021151836 A1 | * | 8/2021 | ........... B64C 31/036 |

* cited by examiner

ELECTRIC POWERED PARAGLIDER

This International Application claims priority from a complete patent application filed in India having Patent Application No. 201921030531, filed on Jul. 29, 2019 and PCT Application filed with the World International Property Organisation (WIPO) having Patent Application No. PCT/IB2019/057611, filed on Sep. 10, 2019 titled "AN ELECTRIC POWERED PARAGLIDER"

FIELD OF INVENTION

Embodiments of a present disclosure relate to flying apparatus, and more particularly to an electric powered paraglider.

BACKGROUND

Paragliders are the lightweight free-flying aircraft used for adventure sport flying. In an existing approach, the paraglider includes a propulsion unit to create desired thrust by using a gasoline engine. The gasoline engine is heavy, loud, creates lot of vibrations and is difficult to start. The fueling process of the existing approach is time consuming, messy and expensive.

In a new approach, a powered paraglider includes a propulsion unit to create desired thrust by using an electric motor. The electric motor is driven by a plurality of batteries but when it comes to the powered paraglider it is very important to maintain battery charge equally at any charge state with respect to each of the plurality of batteries. But maintaining battery charge equally at any charge state with respect to each of the plurality of batteries is an important and a complex task. Unfortunately, there is no option for maintaining the battery charge equally at any charge state with respect to each of the plurality of batteries in the newer approach.

The plurality of batteries can create weight imbalance in the powered paraglider in the newer approach. There is no option to overcome the weight imbalance in the powered paraglider in the newer approach. Replacing discharged batteries is a tedious task and time-consuming task because there is no option to speed up the battery swapping process in the newer approach. And thus, these existing and newer approaches are not suitable to make an effective electric powered paraglider.

Hence, there is a need for an improved electric powered paraglider to address the aforementioned issues.

BRIEF DESCRIPTION

In accordance with one embodiment of the disclosure, an electric powered paraglider is provided. The electric powered paraglider includes a frame which includes a plurality of connector points. The electric powered paraglider also includes a propulsion unit mechanically coupled to the frame. The propulsion unit includes at least one propeller and is configured to generate a predefined amount of thrust using at least one electric motor. The electric powered paraglider also includes a throttle controller unit mechanically coupled to the frame and a flight control unit. The throttle controller unit includes at least three switches. The at least three switches are configured to operate one or more parameters of the paraglider in one of at least three modes. The electric powered paraglider also includes a power latching unit mechanically coupled to the frame. The power latching unit includes a plurality of batteries. The power latching unit is configured to allow a user to swap the plurality of batteries by implementing a power latching mechanism.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprise", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to an electric powered paraglider. The electric powered paraglider includes a frame which includes a plurality of connector points. The electric powered paraglider also includes a propulsion unit mechanically coupled to the frame. The propulsion unit includes at least one propeller and is configured to generate a predefined amount of thrust using at least one electric motor. The electric powered paraglider also includes a throttle controller unit mechanically coupled to the frame and a flight control unit. The throttle controller unit includes at least three switches. The at least three switches are configured to operate one or more parameters of the paraglider in one of at least three modes. The electric powered paraglider also includes a power latching unit mechanically coupled to the frame. The power latching unit includes a plurality of batteries. The power latching unit is configured to allow a user to swap the plurality of batteries by implementing a power latching mechanism.

Figure 1:
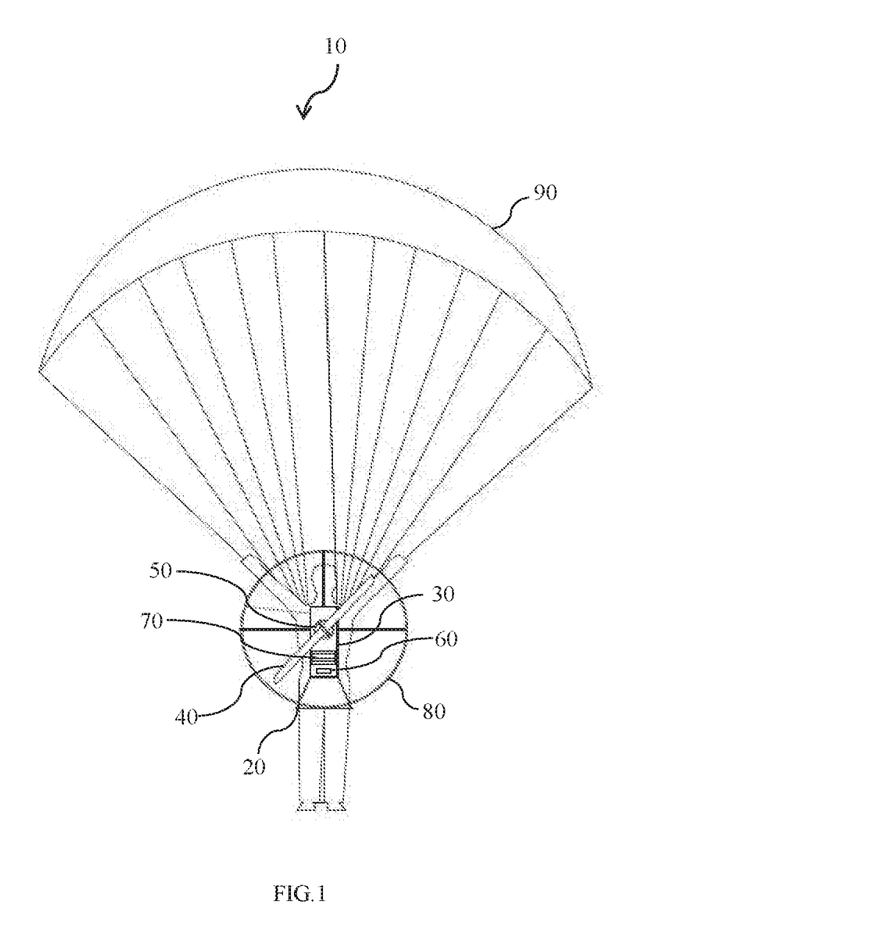
FIG. 1 is a schematic representation of an electric powered paraglider in accordance with an embodiment of the present disclosure.
Figure 3:
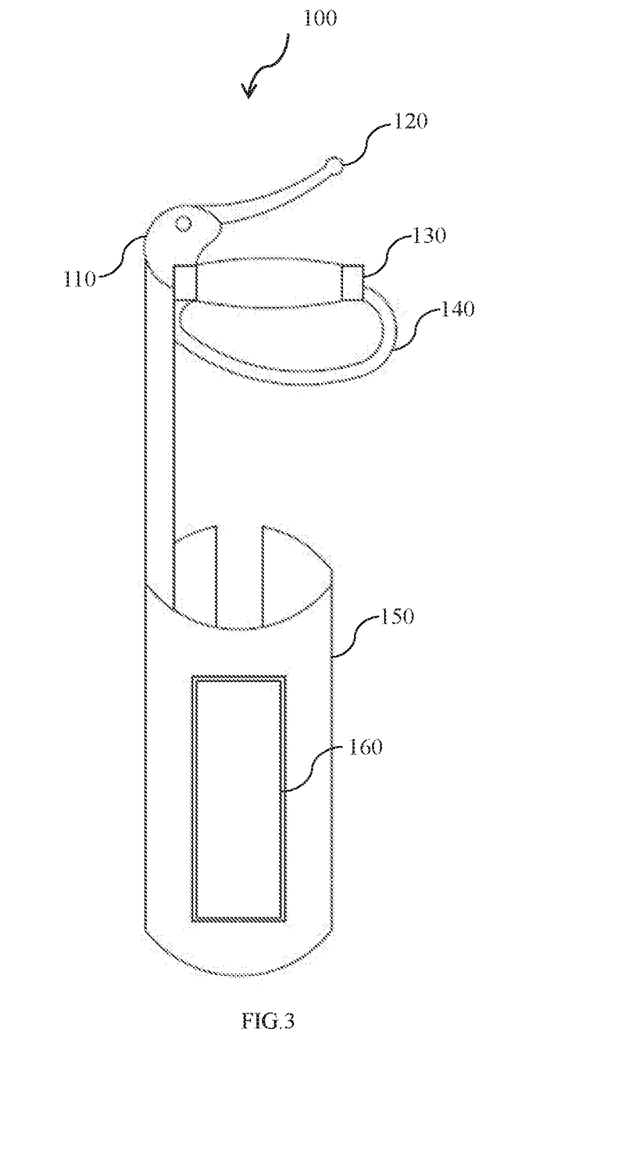
FIG. 3 is a schematic representation of a throttle controller unit and a flight information display of the electric powered paraglider of FIG. 1 in accordance with an embodiment of the present disclosure.
Figure 5:
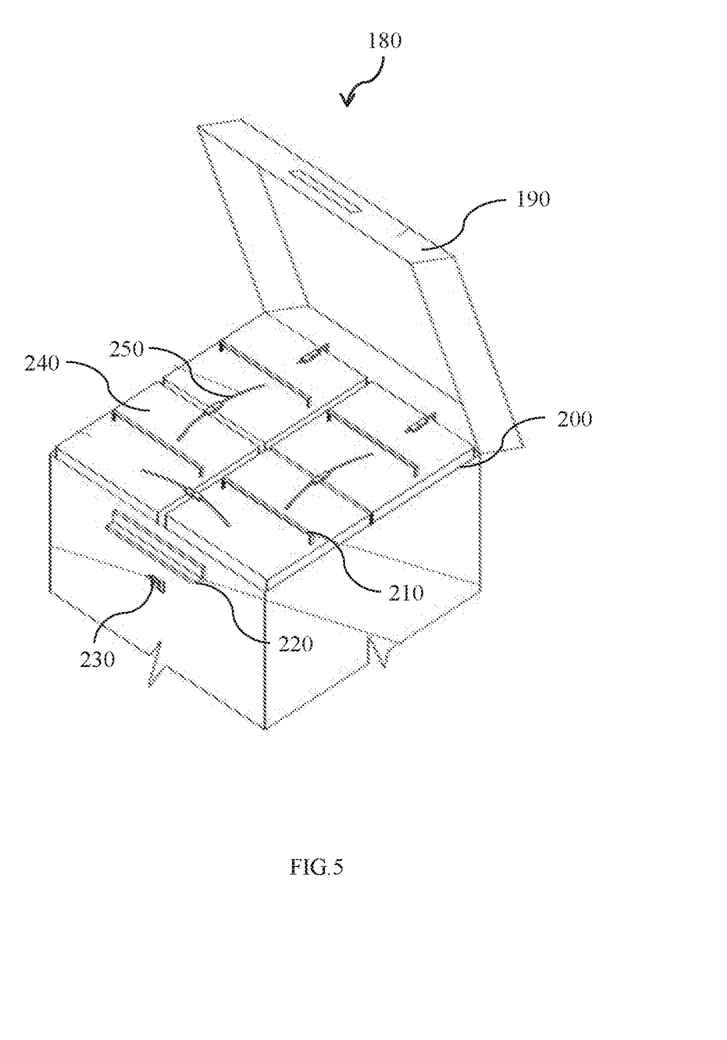
FIG. 5 is a schematic representation of a power latching unit of the electric powered paraglider of FIG. 1 in accordance with an embodiment of the present disclosure.

FIG. 1 is a schematic representation of an electric powered paraglider 10 in accordance with an embodiment of the present disclosure. The electric powered paraglider 10 includes a frame 20. The frame includes a plurality of connector points. The frame 20 is attached to at least one of a propulsion unit 30, a throttle controller unit 100 (As shown in FIG. 3), a power latching unit 180 (As shown in FIG. 5), a flight control unit 60, and a weight balancing unit via the plurality of connector points. The propulsion unit 30 includes at least one electric motor 50. In one embodiment, the electric powered paraglider 10 also includes a seat and harness. The seat and harness of the electric powered paraglider are attached to the frame 20 via the plurality of connector points. In one embodiment, the electric powered paraglider 10 also includes an air bag and a cushioning mechanism. In such embodiment, the cushioning mechanism is positioned near a bottom portion of the harness which provides a cushioning effect to protect the pilot in a hard landing situation.

Figure 2:
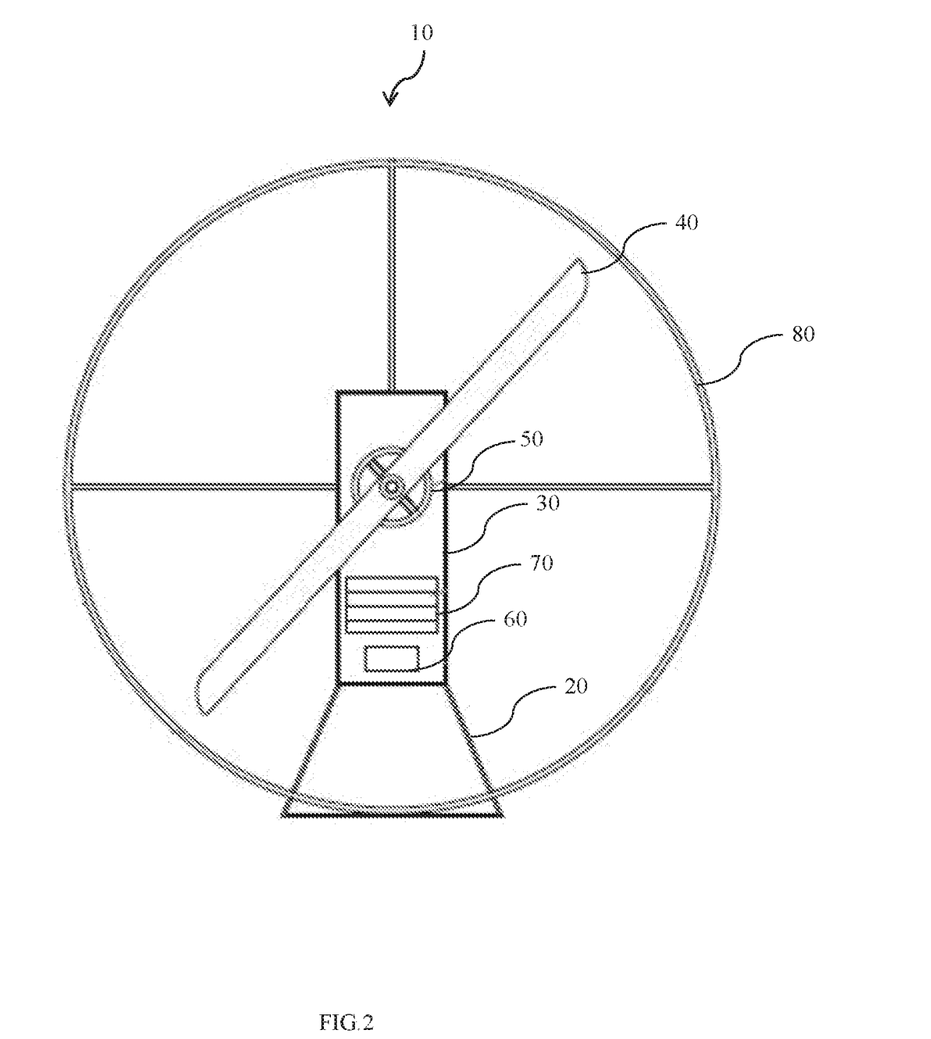
FIG. 2 is a schematic representation of a propulsion unit of the electric powered paraglider of FIG. 1 in accordance with an embodiment of the present disclosure.

The propulsion unit 30 includes at least one propeller 40 and configured to generate a predefined amount of thrust using the at least one electric motor 50. In one embodiment, the at least one electric motor 50 may be a direct current (DC) motor. In such embodiment, the DC motor may be at least one of a brushed DC motor, and a brushless DC motor. In one embodiment, the at least one electric motor 50 may be an Alternate Current (AC) motor. The at least one electric motor 50 may include a predefined characteristic. The at least one electric motor 50 is coupled to the propulsion unit 30. In one embodiment, the at least one electric motor 50 is coupled to the propulsion unit 30 via at least one of a reduction gear, and a pulley. The at least one electric motor 50 may be permanently coupled to the propulsion unit 30. In one embodiment, the at least one propeller 40 may be detachably coupled to the at least one electric motor 50 using a fastening mechanism. As used herein, the term 'fastening mechanism' is defined as a mechanism that mechanically joins or affixes two or more objects together. In general, fastening mechanism is used to create non-permanent joints which can be removed or dismantled without damaging the joining components. The fastening mechanism may include at least one of a plurality of bolts and a plurality of nuts.

In one embodiment, the propulsion unit 30 may include one propeller. In one embodiment, the propulsion unit 30 may include at least two propellers. The at least two propellers placed in a predetermined distance from the central axis of the electric powered paraglider 10. The predetermined distance is fixed in such a way the airflow from the at least two propellers do not interfere with each other and such that the blades of the propellers move freely of each other. In one embodiment, the predetermined distance may be fixed in such a way that the thrust is evenly generated around the central axis of the electric powered paraglider. Counter rotating propellers are chosen for such a multi-propeller setup so that the propellers cancel the effect of torque generated by each other.

The electric powered paraglider also includes an electronic speed controller unit 70. The electronic speed controller unit 70 is mechanically coupled to the flight control unit 60. The electronic speed controller unit 70 is configured to regulate an output power of a plurality of batteries 240 (As shown in FIG. 5). The plurality of batteries 240 As shown in FIG. 5 is placed in the power latching unit 180 (As shown in FIG. 5). In one embodiment, the plurality of batteries 240 (As shown in FIG. 5) may be placed in the power latching unit 180 (As shown in FIG. 5). The electronic speed controller unit 70 is also configured to drive the at least one electric motor 50 by regulating a regulated output power of the plurality of batteries 240 As shown in FIG. 5 of the power latching unit 180 (As shown in FIG. 5). The electronic speed controller unit 70 is also configured to monitor, and control the regulated output power of the power latching unit 180 (As shown in FIG. 5). In one embodiment, a heat sink is coupled to the electronic speed controller unit 70. The heat sink dissipates the heat generated as a result of powering the motor-propeller operation.

The electric powered paraglider 10 also includes a throttle controller unit 100 (As shown in FIG. 3) mechanically coupled to the flight control unit 60. In one embodiment, the throttle controller unit 100 (As shown in FIG. 3) is wirelessly coupled to the flight control unit 60. The throttle controller unit 100 (As shown in FIG. 3) includes at least three switches. The at least three switches are configured to operate one or more parameters of the paraglider in one of three modes. At least three modes include at least one of a cruise setting mode, a cruise reducing mode and a cruise cancel mode. In one embodiment, the cruise setting mode allows the pilot to set a predetermined Revolutions Per Minute (RPM) value. In one embodiment, the pilot may operate at least three modes by using at least three switches. In another embodiment, the cruise reducing mode allows the pilot to reduce the RPM value. The throttle controller is also configured to provide a wireless link.

The throttle controller unit 100 (As shown in FIG. 3) is also configured to primarily control propulsion. In one embodiment, the throttle controller unit 100 (As shown in FIG. 3) may be a handheld unit. In such embodiment, the throttle controller unit 100 (As shown in FIG. 3) may be attached to at least one of a palm and wrist of the pilot. At least one of the throttle lever 120 (As shown in FIG. 3), the handle 130 (As shown in FIG. 3), the palm strap 140 (As shown in FIG. 3), and the arm strap 150 (As shown in FIG. 3) are fabricated in a predetermined manner to operate in a single hand. In one embodiment, the throttle controller unit 100 (As shown in FIG. 3) is coupled to the flight control unit 60 via a signal cable. In one embodiment, the throttle controller unit 100 As shown in FIG. 3 is coupled to the flight control unit 60 via a wireless link. The cruise control signal is generated at the throttle controller unit 100 (As shown in FIG. 3), and transmitted to the flight control unit 60.

The electric powered paraglider 10 also includes a flight information display 160 (As shown in FIG. 3). The flight information display 160 (As shown in FIG. 3) is coupled to the flight control unit 60. The flight information display 160 (As shown in FIG. 3) is configured to display at least one of the plurality of logs of the one or more flight, engine and the plurality of battery parameters of the plurality of batteries 240 (As shown in FIG. 5). The flight information display 160 (As shown in FIG. 3) includes at least one of one or more alarms and one or more buzzers to alert the pilot. In one embodiment, the throttle controller unit 100 (As shown in FIG. 3) is coupled to the flight control unit 60 via flight information display 160 (As shown in FIG. 3) using at least one of a wired link, and a wireless link. In another embodiment, the flight control unit 60 is coupled to the throttle controller unit 100 (As shown in FIG. 3) directly without intervention of the flight information display 160 (As shown in FIG. 3). In another embodiment, a computing device may act as a flight information display 160 (As shown in FIG. 3). In such embodiment, the computing device may be a wearable device. In one embodiment, the throttle controller unit 100 (As shown in FIG. 3) may be a wearable device. In one embodiment, the throttle controller unit 100 to select at least one of cruise set, cruise increase, cruise reduce, and cruise cancel and the like. As used herein, the term 'cruise set' is defined as a setting an RPM value fixed by the throttle controller unit 100 (As shown in FIG. 3) without requiring any further input from the pilot. The pilot may increase and decrease the RPM by adjusting the cruise set.

In some embodiments the throttle controller unit 100 (As shown in FIG. 3) may allow the pilot to make a communication with a control room via a dedicated button. In such embodiment, the communication may be a push to talk communication. In one embodiment, the button may act as a transmitter and receiver. In such embodiment, the button may act as the transmitter when the button is pressed by the pilot. In another such embodiment, the button may act as the receiver when the button is released by the pilot.

The flight control unit 60 includes a flight control processor. The flight control unit 60 is configured to determine speed Revolutions per Minute of the propulsion unit 30. The flight control unit 60 is also configured to control the speed Revolutions per Minute of the propulsion unit 30 by controlling the output power of the plurality of batteries 240 (As shown in FIG. 5), which are placed inside the power latching unit 180 (As shown in FIG. 5), using the processor. The flight control unit 60 is also configured to monitor a plurality of logs of one or more flights. The flight control unit 60 is also configured to maintain the plurality of logs of one or more flights using the processor. In one embodiment, flight control 60 unit allows the pilot to download logs of the one or more flights. The flight control unit 60 is also configured to monitor one or more wired or wireless communications within the paraglider. The flight control unit 60 is also configured to control one or more wired or wireless communications within the paraglider using the processor.

The flight control unit 60 provides an interface to access the electric powered paraglider 10 from a remote position. In one embodiment, the remote access may be in a form of at least one of a Bluetooth, a Wide Fidelity wi-fi, a wired communication, and a wireless communication. The remote access will allow a remote user to access the electric powered paraglider. In one embodiment, the remote access will allow the remote user to troubleshoot the electric powered paraglider. In such embodiment, the remote access may be possible by using a computing device. In one embodiment, the computing device may include a hand held device or a portable device.

The flight control unit 60 is communicatively connected to at least one of the throttle controller 100 (As shown in FIG. 3), the flight information display 160 As shown in FIG. 3, the electronic speed controller 70. The electric powered paraglider 10 also includes a battery management unit, and is coupled to the flight control unit 60. The battery management unit is configured to maintain uniform state of charge of the plurality of batteries 240 As shown in FIG. 5 at any charge state of the battery pack. In one embodiment, the battery management unit allows to place fully charged of the plurality of batteries. Further, the battery management unit monitors the charge level of the plurality of batteries 240 (As shown in FIG. 5), and the battery management unit will allow the plurality of batteries 240 (As shown in FIG. 5) to discharge till a predetermined critical voltage. In another embodiment, the battery management unit monitors the charge level of the plurality of batteries, and the battery management unit will allow the plurality of batteries to charge to a full charged state. The battery management unit 240 (As shown in FIG. 5) includes a subsystem which transfers the plurality of battery parameters to the flight control unit 60. In one embodiment, the battery parameters may include a voltage level of the plurality of batteries 240 (As shown in FIG. 5). The flight control unit 60 initiates an alarm when the voltage level of the plurality of batteries 240 (As shown in FIG. 5) is less than the predetermined critical voltage, and further, the flight control unit 60 initiates a charging operation when the voltage level of the plurality of batteries is less than the predetermined critical voltage.

The flight control unit 60 may control the electronic speed controller 70 by controlling the value of throttle controller unit 100 (As shown in FIG. 3). The flight control unit 60 may decide when to observe at least one of the throttle controller unit 100 (As shown in FIG. 3) and the cruise set upon receiving inputs from sensors. In one embodiment, the flight control unit 60 may decide when not to observe at least one of the throttle controller unit 100 (As shown in FIG. 3) and the cruise set upon receiving inputs from sensors. In one embodiment, the flight control unit 60 may control a throttle value of the throttle controller unit 100 As shown in FIG. 3 based on a plurality of parameters. In such embodiment, the plurality of parameters may include, but not limited to, low voltage, over time, altitude, and geo-fencing.

Figure 4:
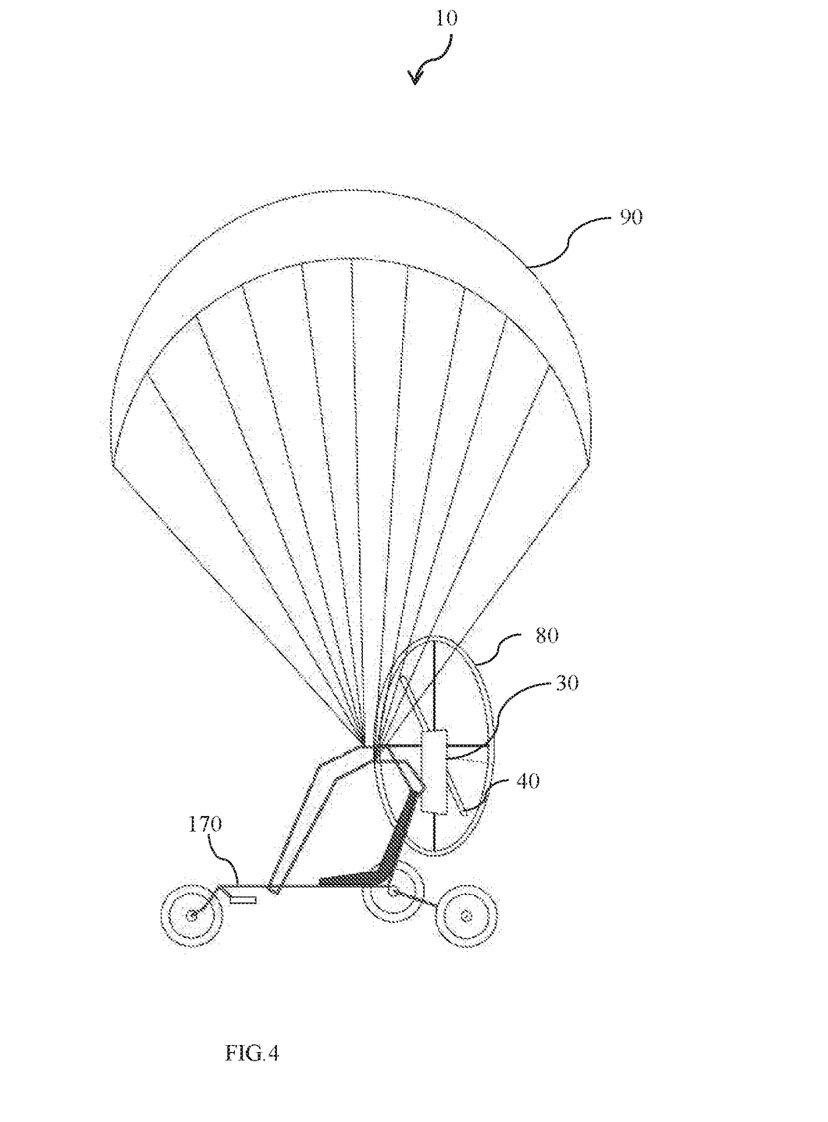
FIG. 4 is a schematic representation of the electric powered paraglider with trike in accordance with an embodiment of the present disclosure.

In one embodiment, the electric powered paraglider 10 may be foot launched. In one embodiment, the pilot needs to use feet for take-off and landing procedure. In another embodiment, the electric powered paraglider 10 may include a trike 170 (As shown in FIG. 4) structure. In such embodiment, the trike 170 (As shown in FIG. 4) structure may include three wheels for take-off and landing procedure. In yet another embodiment, the electric powered paraglider 10 may include a quad structure. In such embodiment, the quad structure may include four wheels for take-off and landing procedure. In one embodiment, the thrust generated by the propulsion unit 30 provides the necessary force to at least one of the Trike 170 As shown in FIG. 4 and the Quad structure for take-off and landing procedure.

The electric powered paraglider 10 also includes a power latching unit 180 (As shown in FIG. 5) mechanically coupled to the frame 20. The power latching unit 180 (As shown in FIG. 5) includes a plurality of batteries 240 (As shown in FIG. 5). The power latching unit 180 (As shown in FIG. 5) is configured to allow a user to swap the plurality of batteries 240 (As shown in FIG. 5) by implementing a power latching mechanism. In one embodiment, the power latching unit 180 (As shown in FIG. 5) may include a lid 190 (As shown in FIG. 5), a quick swap battery compartment 200 (As shown in FIG. 5), a battery carrying handle 210 (As shown in FIG. 5), a fastening mechanism 220 (As shown in FIG. 5), a power switch with a circuit breaker 230 (As shown in FIG. 5), the plurality of batteries 240 (As shown in FIG. 5), and a battery cable with a connector 250 9As shown in FIG. 5). The quick swap battery compartment 200 (As shown in FIG. 5) is fabricated in such manner to hold the plurality of batteries 240 (As shown in FIG. 5). A quick release mechanism may release the plurality of batteries 240 (As shown in FIG. 5) at a time of swapping. The plurality of batteries is swapped by using a quick swap mechanism.

The power latching unit 180 (As shown in FIG. 5) also includes a battery charge monitoring subsystem. A predetermined charge level may be stored in the battery charge monitoring subsystem. The battery charge monitoring subsystem may measure battery charge of the plurality of the batteries 240 (As shown in FIG. 5). The battery charge monitoring subsystem may maintain battery charge equally at any charge state with respect to each of the plurality of batteries 240 9 (As shown in FIG. 5). The battery charge monitoring subsystem may generate an alert to the pilot when battery charge of the plurality of the batteries 240 (As shown in FIG. 5) exceeds the predetermined charge level. The battery charge monitoring subsystem may activate a charger to charge the plurality of batteries 240 (As shown in FIG. 5) when the battery charge of the plurality of the batteries 240 (As shown in FIG. 5) reaches a predetermined lower level. The battery charge monitoring subsystem may deactivate the charger when the battery charge of the plurality of the batteries 240 (As shown in FIG. 5) reaches a predetermined upper level. In one embodiment, the predetermined upper level may be a full charge.

In one embodiment, the power latching unit 180 (As shown in FIG. 5) also includes a Battery Pack. The battery pack may include the plurality of batteries 240 (As shown in FIG. 5) for easy access at the time of swapping. In one embodiment, the Battery Pack is provided with markings. In such embodiment, the marking may provide a plurality of details. The plurality of details may help the user to identify the plurality of batteries and position details. In one embodiment, the battery pack may include the battery cable with the connector 250 to connect the plurality of batteries 240 (As shown in FIG. 5) in a predetermined sequence. In one embodiment, the battery pack may include a system to ensure connection of the plurality of batteries 240 (As shown in FIG. 5). The system may provide an alert to the pilot when connection of the plurality of batteries 240 (As shown in FIG. 5) is not in the predetermined manner. The system may check the plurality of batteries 240 (As shown in FIG. 5) belongs to a predetermined type or not. The system may provide the alert to the pilot when the plurality of batteries 240 (As shown in FIG. 5) does not belongs to a predetermined type.

The electric powered paraglider 10 also includes a weight balancing unit mechanically coupled to the propulsion unit 30, and configured to balance the weight of the electric powered paraglider 10 by allowing the user to place the plurality of batteries 240 (As shown in FIG. 5) in a predetermined manner. Placing the plurality of batteries 240 (As shown in FIG. 5) in the predetermined manner may help to align the centre of gravity of the Battery Pack and centre of gravity of the electric powered paraglider 10. The plurality of batteries 240 (As shown in FIG. 5) may be placed near by hip of the pilot. In one embodiment, the plurality of batteries 240 (As shown in FIG. 5) is placed near the bottom of the electric powered paraglider 10. In one embodiment, the plurality of batteries 240 (As shown in FIG. 5) is placed in a higher location of the electric powered paraglider 10 to increase safety of the electric powered paraglider 10 during a hard landing. In one embodiment, the weight balancing unit may include a compartment to place the plurality of batteries 240 (As shown in FIG. 5). In such embodiment, the compartment may include a plate. The plate is placed between the pilot and the plurality of batteries 240 (As shown in FIG. 5) as a safety measure.

The electric powered paraglider 10 also includes an on/off switch. The on/off switch may allow the pilot to turn on/turn off power supply of the electric powered paraglider 10. The on/off switch ensures no power is lost by the electric powered paraglider 10 at storage time. The electric powered paraglider 10 also includes an anti-spark circuit. The anti-spark circuit may protect the electric powered paraglider 10 from sudden spikes of heavy current flow. The anti-spark circuit may activate and stop the sudden spikes of heavy current flow to avoid damages of the electric powered paraglider 10.

The electric powered paraglider 10 also includes a manual emergency power control mechanism which is operated by the pilot. The manual emergency power control mechanism may activate at the time of emergency. The pilot can activate the manual emergency power control mechanism to shut down the electric powered paraglider 10 at the time of emergency.

Various embodiments of the present disclosure enable apparatus to reduce weight of the electric powered paraglider by using the plurality of batteries. In addition to that, the present disclosure maintains battery charge equally at any charge state with respect to each of the plurality of batteries. Furthermore, the present disclosure balances the weight of the electric powered paraglider using the weight balancing unit.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may be combined into a single functional element. Alternatively, certain elements may be split into multiple functional elements. Elements from one embodiment may be added to another embodiment. For example, order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

We claim:
1. An electric powered paraglider, comprising:
   a frame comprising a plurality of connector points;
   a propulsion unit mechanically coupled to the frame, wherein the propulsion unit comprises at least one propeller, wherein the at least one propeller is configured to generate a predefined amount of thrust using at least one electric motor;
   a throttle controller unit mechanically coupled to the frame and a flight control unit, wherein the throttle controller unit comprises at least three switches, wherein at least three switches are configured to operate one or more parameters of the paraglider in one of three modes; and
   a power latching unit mechanically coupled to the frame, wherein the power latching unit comprises a plurality of batteries, wherein the power latching unit is configured to allow a user to swap the plurality of batteries by implementing a power latching mechanism.

2. The system as claimed in claim 1, wherein at least three modes comprises at least one of a cruise setting mode, a cruise reducing mode and a cruise cancel mode.

3. The system as claimed in claim 1, further comprising a flight control unit mechanically coupled to the frame, and configured to:
   control speed of the propulsion unit by controlling an output power of the plurality of batteries;
   maintain a plurality of logs of one or more flights; and
   control one or more wired or wireless communications within the electric powered paraglider.

4. The system as claimed in claim 1, further comprising a weight balancing unit mechanically coupled to the flight control unit, and configured to balance the weight of the electric powered paraglider by allowing the user to place the plurality of batteries in a predetermined and optimal manner.

* * * * *